United States Patent [19]

Wehr

[11] Patent Number: 4,879,120
[45] Date of Patent: Nov. 7, 1989

[54] POLYCAPROLACTAM WITH TITANIUM DIOXIDE CONTENT

[75] Inventor: Rudolf Wehr, Wachenheim, Fed. Rep. of Germany

[73] Assignee: BASF Aktiengesellschaft, Ludwigshafen, Fed. Rep. of Germany

[21] Appl. No.: 236,211

[22] Filed: Aug. 25, 1988

[51] Int. Cl.$^4$ ................................................ C08K 3/22
[52] U.S. Cl. .................................... 524/430; 524/497; 524/606; 524/847; 524/879
[58] Field of Search ............... 524/430, 497, 606, 847, 524/879

[56] References Cited

U.S. PATENT DOCUMENTS

| | | | |
|---|---|---|---|
| 3,450,662 | 6/1969 | Tierney | 524/879 |
| 3,523,810 | 8/1970 | Swank | 524/497 |
| 4,053,457 | 10/1977 | Cordes et al. | 528/323 |
| 4,388,425 | 6/1983 | Strehler et al. | 524/879 |

FOREIGN PATENT DOCUMENTS 0123881 11/1986 European Pat. Off. .

*Primary Examiner*—Lewis T. Jacobs
*Attorney, Agent, or Firm*—Keil & Weinkauf

[57] ABSTRACT

A $TiO_2$-containing polycaprolactam contains, based on $TiO_2$, less than 0.1% by weight of 100° C. water solubles and from 2 to 15% by weight of monomeric caprolactam and oligomers thereof, based on polycaprolactam.

4 Claims, No Drawings

POLYCAPROLACTAM WITH TITANIUM DIOXIDE CONTENT

The polymerization of caprolactam gives a poly caprolactam containing for example from 8 to 15% by weight of monomeric caprolactam and oligomers thereof. However, to process polycaprolactam into shaped articles such as filaments or injection moldings the level of such extractables must be low. For this reason polycaprolactam is extracted with water at elevated temperatures. To avoid caprolactam losses the extract liquors are concentrated, for example up to a caprolactam content of not less than 80%, and returned into the polymerization stage without further purification together with fresh lactam. A suit-able process is described for example in German Published Application DAS No. 2,501,348. To avoid the formation of fouling deposits on heat exchange surfaces during the process of evaporation, EP Application No. 123,881 proposes that caprolactam be added to the extract to be concentrated by evaporation, thereby maintaining an adequate level of caprolactam from the start.

It is frequently desired, however, to produce matt polycaprolactam by addition of titanium dioxide. In general the titanium dioxide is added during the polymerization of caprolactam to ensure uniform fine division. If, then, the extract obtained from a $TiO_2$-containing polycaprolactam is concentrated by evaporation, for example as described in EP Application No. 123,881, then, notwithstanding the addition of monomeric caprolactam, fouling deposits are formed on heat exchange surfaces. This is undesirable because it reduces heat transfer efficiency and, what is more, causes further, gel-forming precipitations.

It is an object of the present invention to provide $TiO_2$-containing polycaprolactam which, on extraction and evaporation of the extracts, does not give rise to fouling deposits on heat exchange surfaces, nor to the precipitation of further substances.

We have found that this object is achieved with a polycaprolactam with a titanium dioxide content which, based on titanium dioxide, contains less than 0.1% by weight of 100° C. water solubles and from 8 to 15% by weight of monomeric caprolactam and oligomers thereof, based on polycaprolactam.

The present invention also relates to the use of a titanium dioxide containing polycaprolactam which, based on titanium dioxide, contains less than 0.1% by weight of 100° C. water solubles and from 8 to 15% by weight of monomeric caprolactam and oligomers thereof, based on polycaprolactam, for preparing polycaprolactam containing less than 1% by weight of monomeric caprolactam and oligomers thereof by extraction with water at from 80° to 130° C., evaporation of the extract and the reuse of the concentrate obtained without further purification for polymerization together with fresh caprolactam.

The novel $TiO_2$-containing polycaprolactam has the advantage that the aqueous extracts can be concentrated by evaporation without fouling deposits being formed on the heat exchange surfaces.

The polycaprolactam according to the invention advantageously has a relative viscosity of from 2.2 to 3.5. Furthermore, the polycaprolactam according to the invention contains from 8 to 15, in particular from 9 to 12% by weight of monomeric caprolactam and oligomers thereof, based on polycaprolactam. Moreover, the polycaprolactam according to the invention has a titanium dioxide content, containing for example from 0.1 to 2.5% by weight, in particular from 0.1 to 1.5% by weight, preferably of anatase which, based on titanium dioxide, contains less than 0.1% by weight, advantageously from 0.01 to 0.05% by weight, of 100° C. water solubles. Such solubles comprise for example silicon dioxide and silicates. Preferably, the titanium dioxide contains less than 0.1% by weight, for example from 0.01 to 0.05% by weight, of silicon compounds soluble in water at 100° C., based on titanium dioxide. It is particularly advantageous for the titanium dioxide to contain up to 5% by weight of aluminum oxide, for example from 0.5 to 3% by weight of aluminum oxide, based on titanium dioxide.

The level of solubles in titanium dioxide is determined as follows: 25 g of titanium dioxide are refluxed with 250 ml of demineralized water for 24 hours, the titanium dioxide is filtered off, the filtrate is evaporated to dryness, and the residue is weighed.

The polycaprolactam according to the invention is for example obtainable by polymerization of caprolactam by the precondensation tube procss wherein molten caprolactam enters the precondensation tube at the top together with water, for example from 0.3 to 5% by weight of water, and polymerizes at from 240° to 280° C. as it passes downward through the precondensation tube. At the bottom end the polymer is for example extruded, cooled and granulated. Titanium dioxide of the above-specified grade is advantageously introduced into the polymerization, for example in the form of an aqueous dispersion, together with the caprolactam. Alternatively, it is also possible to incorporate titanium dioxide having the abovementioned properties, preferably in the form of a $TiO_2$ concentrate in polycaprolactam, into the fluid polycaprolactam melt by thorough mixing, for example in an extruder.

Titanium dioxide having the abovementioned properties is for example obtainable by treating commercial titanium dioxide at from 90° to 110° C., in particular at from 90° to 100° C., with water, advantageously fully demineralized water, for from 10 to 30 hours, in particular for from 10 to 24 hours, and then separating off the titanium dioxide by decanting and if necessary washing it once more with water at 100° C.

The polycaprolactam according to the invention is advantageously used for producing polycaprolactam containing less than 1% by weight, in particular from 0.4 to 0.8% by weight, of monomeric caprolactam and oligomers thereof by extraction with water at from 80° to 130° C., evaporation of the extract and recycling of the concentrate obtained into the polymerization without further purification together with fresh caprolactam.

The extraction is advantageously carried out by passing the polycaprolactam granules according to the invention downward through an extraction apparatus and passing water at from 80° to 130° C., in particular from 90 to 125° C., upward through the extraction apparatus. The extracted polycaprolactam containing less than 1% by weight of caprolactam and oligomers thereof is withdrawn at the bottom end and dried, while at the top of the extraction apparatus an aqueous extract is obtained where said extract generally contains from 5 to 20% by weight of caprolactam and oligomers thereof. This extract is advantageously concentrated to a solids content of not less than 80% in the absence of atmospheric oxygen, with the proviso that if the solids concentration is higher than 50% temperatures of from 130° to 210° C. and residence times of not more than 30 minutes are employed and, what is more, the extract-contacted surfaces are made of stainless steel. Advantageously, the extract to be evaporated is additionally admixed with caprolactam in order to maintain a sufficiently high level of caprolactam in the process of evaporation from the start. The concentrate thus obtained is reused for the polymerization without further purification, advantageously together with fresh caprolactam. Suitable processes are described for example in German Published Application DAS No. 2,501,348 and EP Application No. 123,881.

The invention is illustrated in the following Examples:

EXAMPLE 1

4,000 kg of polycaprolactam having a relative viscosity of 2.70 and containing 11% by weight of extractables (9% by weight of caprolactam and 2% by weight of oligomers of caprolactam) and 0.27% by weight of titanium dioxide (anatase having a titanium dioxide content of 99% by weight) containing 0.03% by weight of 100° C. water solubles are continuously extracted with 3,000 kg per hour of fully demineralized water in countercurrent at from 115° to 125° C. and then continuously dried in the absence of molecular oxygen at from 125° to 135° C. 3,580 kg are obtained per hour of a nylon-6 of relative viscosity 2.75 which contains 0.3% by weight of titanium dioxide, 0.5% by weight of extractables (0.1% by weight of caprolactam and 0.4% by weight of cyclic oligomers of caprolactam) and 0.03% by weight of water.

The aqueous extract solution (3,420 kg per hour, including 360 kg of caprolactam per hour and 65 kg of caprolactam oligomers per hour) is evaporated continuously together with 300 kg per hour of caprolactam in two stages at from 115 to 185° C. under a pressure of 1.1 bar absolute to a solids content of 98% by weight and recycled without further purification into the polymerization together with fresh caprolactam.

The apparatus used for evaporating the extract water remains free and unfouled in sustained operation.

EXAMPLE 2 4,000 kg per hour of a polycaprolactam having a relative viscosity of 2.72 and containing 0.26% by weight of titanium dioxide (anatase, 96% by weight of titanium dioxide and 3% by weight of aluminum oxide) having a 100° C. water solubles content of 0.04% by weight and 11.5% by weight of extractables (9.5% by weight of caprolactam and 2% by weight of cyclic oligomers of caprolactam) are extracted as described in Example 1.

The aqueous extract is concentrated by evaporation and recycled without further purification into the polymerization together with caprolactam, both steps being carried out as in Example 1.

The apparatus used for evaporating the extract water remains free and unfouled in sustained operation.

EXAMPLE 3

4,000 kg per hour of polycaprolactam having a relative viscosity of 2.70 and containing 0.27% by weight of titanium dioxide (anatase, 98% of titanium dioxide, 1.5 by weight of aluminum oxide) having a 100° C. water solubles content of 0.03% by weight and 11% by weight of extractables are extracted as described in Example 1.

The aqueous extract is concentrated by evaporation and polymerized without further purification together with fresh caprolactam, both steps being carried out as in Example 1.

The apparatus used for evaporating the extract water remains free and unfouled in sustained operation.

EXAMPLE 4

4,000 kg per hour of polycaprolactam having a relative viscosity of 2.72 and containing 1.5% by weight of titanium dioxide (anatase, 99% by weight of titanium dioxide) having a 100° C. water solubles content of 0.02% by weight and 11% by weight of extractables (9% by weight of caprolactam and 2% by weight of cyclic oligomers of caprolactam) are extracted as described in Example 1. The aqueous extract is concentrated by evaporation and recycled without further purification into the polymerization together with fresh caprolactam, both steps being carried out as in Example 1.

The apparatus used for evaporating the extract water remains free and unfouled in sustained operation.

EXAMPLE 5

4,000 kg per hour of polycaprolactam having a relative viscosity of 2.71 and containing 1.5% by weight of titanium dioxide (anatase, 96% by weight of titanium dioxide, 3% by weight of aluminum oxide) having a 100° C. water solubles content of 0.03% by weight and 11% by weight of extractables (9% by weight of caprolactam and 2% by weight of cyclic oligomers of caprolactam) are extracted as described in Example 1. The aqueous extract is concentrated by evaporation and recycled without further purification into the polymerization together with fresh caprolactam, both steps being carried out as in Example 1.

The apparatus used for evaporating the extract water remains free and unfouled in sustained operation.

EXAMPLE 6

4,000 kg per hour of polycaprolactam having a relative viscosity of 2.72 and containing 1.5% by weight of titanium dioxide (anatase, 98% by weight of titanium dioxide, 1.5% by weight of aluminum oxide) having a 100° C. water solubles content of 0.02% by weight and 11% by weight of extractables (9% by weight of caprolactam and 2% by weight of oligomers of caprolactam) are extracted as described in Example 1. The aqueous extract is concentrated by evaporation and polymerized without further purification together with fresh caprolactam, both steps being carried out as in Example 1.

The apparatus used for evaporating the extract water remains free and unfouled in sustained operation.

COMPARATIVE EXAMPLE 4,000 kg per hour of polycaprolactam having a relative viscosity of 2.70 and containing 0.26% by weight of titanium dioxide (anatase, 95% by weight of titanium dioxide), 1.0% by weight of silicon dioxide, 0.3% by weight of aluminum oxide) having a 100° C. water solubles content of 0.9% by weight and 11% by weight of extractables (9% by weight of caprolactam and 2% by weight of oligomers of caprolactam) are extracted as described in Example 1. The aqueous extract is concentrated by evaporation and recycled without further purification into the polymerization together with fresh caprolactam, both steps being carried out as in Example 1.

The apparatus used for evaporating the extract water needs to be cleaned at regular intervals, since evaporator efficiency decreases by about 30% over 3 weeks and by about 50% over 6 weeks of operation.

The fouling deposit in the evaporating means is 96% $SiO_2$.

I claim:

1. A polycaprolactam with a titanium dioxide content which, based on titanium dioxide, contains less than 0.1% by weight of 100° C. water solubles and from 2 to 15% by weight of monomeric caprolactam and oligomers thereof, based on polycaprolactam.

2. A polycaprolactam as claimed in claim 1, containing, based on titanium dioxide, less than 0.1% by weight of 100° C. water soluble silicon compounds.

3. A polycaprolactam as claimed in claim 1 containing from 0.5 to 3% by weight of aluminum oxide, based on titanium dioxide.

4. A polycaprolactam as claimed in claim 2 containing from 0.5 to 3% by weight of aluminum oxide, based on titanium dioxide.

* * * * *

UNITED STATES PATENT AND TRADEMARK OFFICE
CERTIFICATE OF CORRECTION

PATENT NO. : 4,879,120

DATED : November 7, 1989

INVENTOR(S) : Rudolf WEHR

It is certified that error appears in the above-identified patent and that said Letters Patent is hereby corrected as shown below:

Title page:

Foreign Application Priority Data

September 11, 1987 [DE] Fed. Rep. of Germany ... 3730538

Signed and Sealed this

Nineteenth Day of March, 1991

Attest:

HARRY F. MANBECK, JR.

Attesting Officer

Commissioner of Patents and Trademarks